July 29, 1969

E. F. KELLEY ET AL
METHOD FOR PRODUCING AN EXPANDED FOOD
PRODUCT FROM CEREAL GRAIN 3,458,322

Filed Nov. 9, 1964

INVENTORS.
Edwin F. Kelley
BY Frank J. Thomas

Hovey, Schmidt, Johnson & Hovey
ATTORNEYS

United States Patent Office 3,458,322
Patented July 29, 1969

3,458,322
METHOD FOR PRODUCING AN EXPANDED FOOD
PRODUCT FROM CEREAL GRAIN
Edwin F. Kelley, Kansas City, Mo., and Frank J. Thomas,
Overland Park, Kans., assignors to Kell-Dot Industries,
Inc., Kansas City, Mo., a corporation of Kansas
Filed Nov. 9, 1964, Ser. No. 409,754
Int. Cl. A23l 1/18
U.S. Cl. 99—82                                                                1 Claim

ABSTRACT OF THE DISCLOSURE

An expanded food product is produced by advancing cereal grain material into an extrusion head by a screw flight rotating within a confined, tubular sleeve. The sleeve is internally threaded or grooved oppositely to the screw flight, the groove being transversely curved and defined by three different radii of curvature. As the material is compressed and advanced toward the extrusion head, larger particles thereof are forced into the internal groove and are caused to follow the transverse configuration thereof in a manner to create additional heating by friction so that ultimate reduction in particle size will be obtained before extrusion.

---

This invention relates to the production of expanded food products and, more particularly, to apparatus for and a method of producing large quantities of collets of uniform size and density.

Expanded food products of the type used for party snacks and the like are generally formed from conventional extrusion machines which utilize an extrusion head coupled with a tubular housing or sleeve defining a material passage within which is disposed a screw for advancing material under pressure toward and through the head. The material emanating from the head is in the form of elongated collets which are individual particles of the material in an expanded, self-sustaining condition. It is highly desirable that the physical characteristics of the collets, i.e., the density, length and diameter, be uniform to circumvent certain problems hereinafter set forth.

It has been found that no uniformity in the physical characteristics of these collets can be generally obtained with conventional extrusion machines. This is believed to result because of the inability of the machines to generate and maintain the requisite pressures on the material in the aforesaid material passages to raise the temperature of the material therein sufficiently to plasticize or gelatinize the same for proper extrusion through the head. If this plastic condition is not attained prior to extrusion, the extruded product will be inferior inasmuch as the density thereof may be greater than that which is desired and thereby, the product will be indigestible. If the product is too dense, it cannot be used at all.

The inconsistency in the formation of collets by conventional machines results in high costs of machine operations inasmuch as some inferior products formed thereby must be discarded as being unmarketable. Accordingly, additional quantities of the product must be made to replace the discarded product. Furthermore, problems of packaging the product have been encountered because of the inconsistency in the physical characteristics thereof. For instance, one group of packages of the product may be of the proper weight and contain the requisite volume of the product, while a second group of packages may have too little or too much of the product therein as a result of variations in the density and size thereof so as to detract from the marketable appearance of the packages and to cause some concern with respect to regulations of weights and measures of consumer products.

The present invention provides apparatus for and a method of forming the aforesaid expanded food products in a manner such that large quantities of collets can be formed with substantially all of the collets being of uniform size and density. The uniformity of the collets formed by following the teachings of the present invention is due to the specific construction of certain pressure-applying and material-advancing components which create heat within the material and retain the same under pressure until the grain size and temperature of the material have reached predetermined values. As a result, the material will plasticize before it is expanded and, upon expansion, will be of uniform size and density and in condition to be digested.

It is, therefore, the primary object of the present invention to provide apparatus for and a method of producing an expanded food product in the form of individual, self-sustaining collets and in a manner such that large volumes of the collets can be produced with substantially all of the latter being uniform in physical characteristics.

Another object of the present invention is the provision of apparatus of the type described which accurately controls the temperature and grain size of the material from which the product is made before the material is expanded to form the collets so that the desired end results are attained with a minimum of operational expense inasmuch as substantial wastage of the product and costly reruns of the operation are practically eliminated.

Still another object of the present invention is the provision of an internally grooved sleeve of improved construction which serves to inhibit the expansion of the material until the latter is at the proper pressure, temperature and grain size for optimum uniformity in the physical characteristics of the resulting collets.

Another object of this invention is the provision of an improved extrusion head which cooperates with the sleeves to compress the material sufficiently as the material passes through the head so as to attain the uniformity in the physical characteristics of the collets as the latter emanate from the head and expand into their final configurations.

Still another object of the instant invention is the provision of a method for forming an expanded food product of uniform physical characteristics which includes the step of choking the material flow until the grain size and temperature of the material reach predetermined values as pressure is exerted on the material and as the latter travels to a region of reduced pressure wherby, upon reduction of the pressure, individual collets of unifom size and density will be formed so as to provide a more digestible and thereby saleable product.

Figure 1:
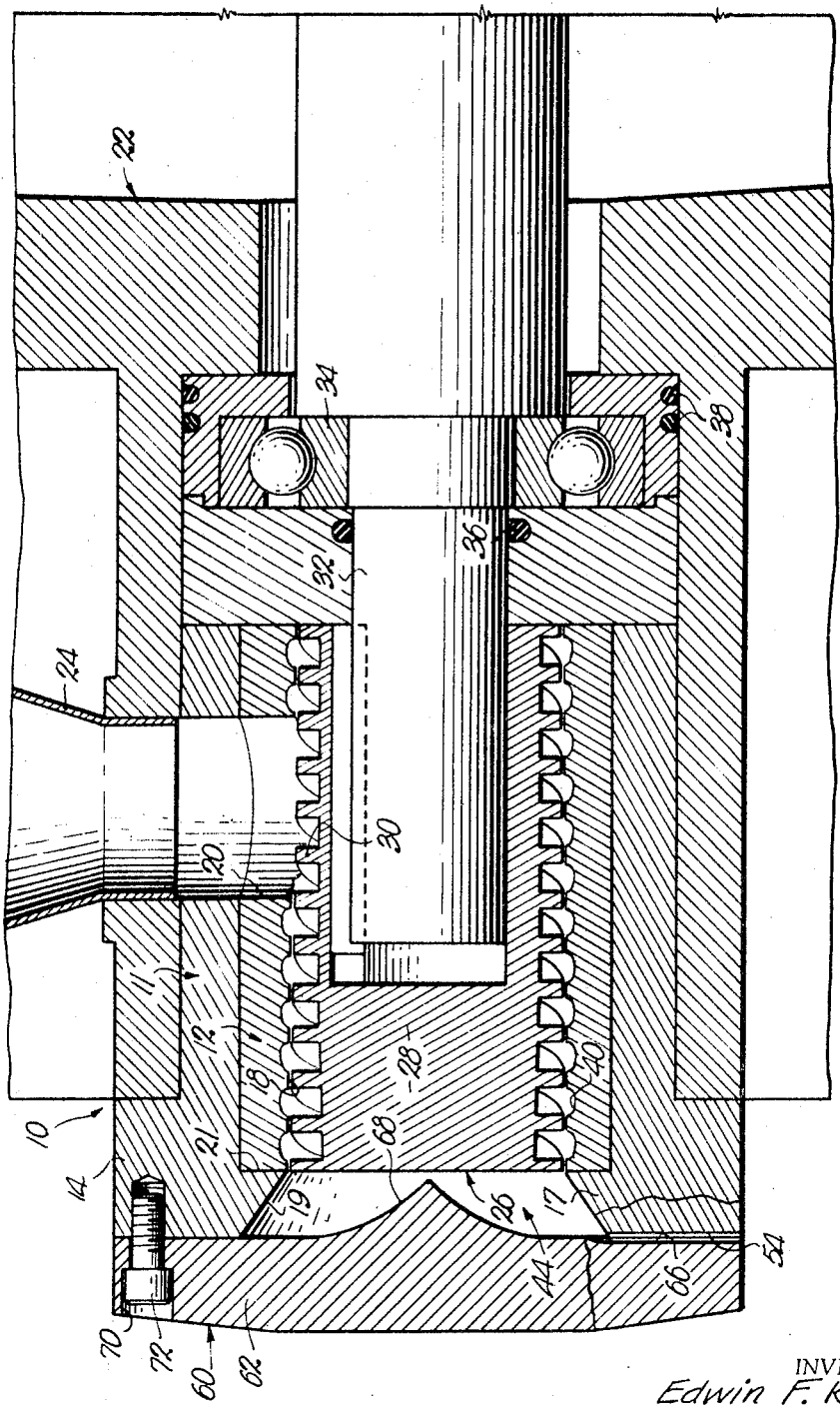
FIGURE 1 is a fragmentary, cross-sectional view of a portion of a machine for forming expanded food products and illustrating the cooperative relationship between a material-receiving sleeve, a material-advancing screw in the sleeve, and an extrusion head across the path of travel of the material advanced by the screw.

The present invention relates to components of an extrusion machine for forming expanded food products such as party snacks or the like, such components being constructed to give relatively long operational life and to result in individual food products in the nature of elongated, self-sustaining collets having uniform density, length and diameter. A material-receiving sleeve having one or more transversely arcuate, spiral grooves on the inner surface thereof forms one of these components; whereas, a material advancing screw having one or more spiral flights thereon forms another of the components, The flight or flights of the screw extend between the ends of the sleeve in a rotative sense oposite to that of the groove or grooves in the sleeve. The flights are in relatively close proximity to the inner surface of the sleeve to provide choke regions which limit the advancement of material in the sleeve to material having a predetermined minimum grain size. Material whose grain size is too large and thereby not advanced through the choke regions is caused to move at random in the grooves along the arcuate surfaces thereof until sufficient heat is generated in the material to plasticize the same and reduce the grain or particle size to the minimum required to effect passage though the choke regions. By maintaining the grooves arcuate in transverse cross section, sufficient pressure is maintained on the material to assure the attainment of the proper temperature of the material for reduction of the particle size. In addition, material is prevented from being retained in pockets or the like which would otherwise occur if the grooves in the sleeve were polygonal in transverse configuration.

An improved xtrusion head coupled with the sleeve serves to compress the material to a sufficient degree to assure that the material, as it emanates from the head in the form of individual, elongated collets, will be of uniform density, length and diameter and in condtiion for marketing.

Extrusion machine 10 includes a tubular housing 11 having an annular enlargement 14 at one end thereof defining an end face 16. An annular, transversely triangular section 17 defines the inner periphery of enlargement 14 and presents a pair of angularly disposed surfaces 19 and 21. A sleeve 12, received within housing in abutting engagement to surface 21, has a central bore defining the inner surface 18 thereof and is provided with a transverse bore 20 communicating with the central bore thereof. Bore 20 is aligned with a transverse bore 23 in housing 11. Sleeve 12 is releasably secured in any suitable manner to housing 11, and the latter is coupled with adjacent structure 22 so that bores 20 and 23 are in alignment with a chute 24 on structure 22 for receiving meal or material to be processed by machine 10 such that the processed material will issue from machine 10 in the form of elongated, self-sustaining collets. Chute 24 is in communication with any suitable source of the material and it is unnecessary for the understanding of the instant invention to further describe this source.

A screw 26 is disposed within the central bore of sleeve 12 and includes a base portion 28 and one or more spirally extending flights 30 on the outer periphery thereof. A shaft 32 extending into the central bore of sleeve 12 is rigidly coupled with base 28 so that, upon rotation of shaft 32 by any suitable means, screw 26 will rotate in a direction to cause material between flights 30 to be advanced toward the end of sleeve 12 defined by flange 14. A suitable bearing 34 and seals 36 and 38 facilitate the rotation of shaft 32 and prevent foreign matter from entering sleeve 12 along shaft 32.

Figure 3:
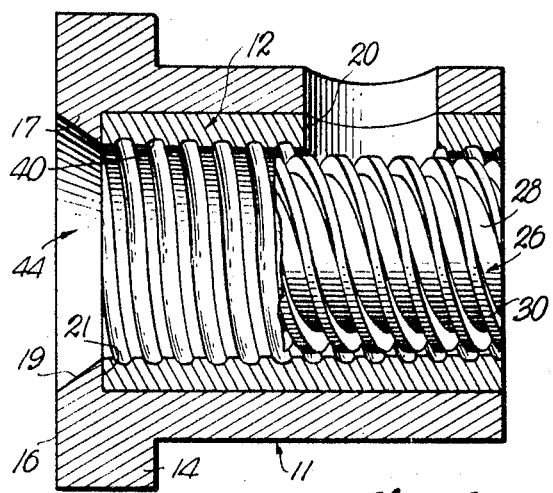
FIG. 3 is a cross-sectional view of the sleeve and further showing a portion of the screw therewithin.
Figure 4:
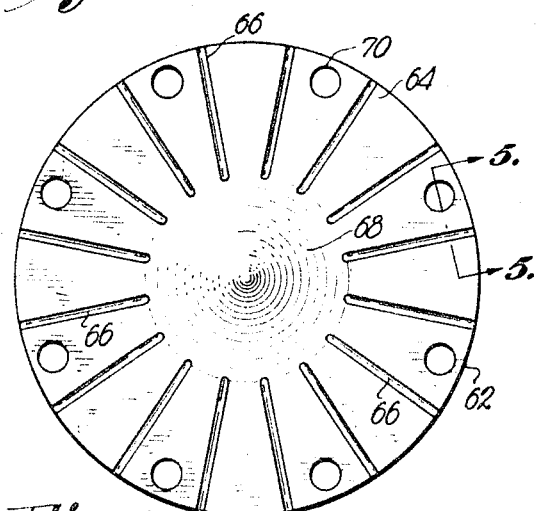
FIG. 4 is an end elevational view of the extrusion head which mates with the end face of the sleeve illustrated in FIG. 2.
Figure 5:
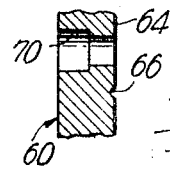
FIG. 5 is a cross-sectional view taken along line 5—5 of FIG. 4.

Sleeve 12 is provided with one or more spiral grooves 40 on the inner surface 18 thereof as illustrated in FIG. 3. For purposes of illustration, sleeve 12 is provided with a pair of spiral grooves 40, whereas screw 26 is provided with four different flights 30. As shown in FIG. 3, screw 26 is disposed within sleeve 12 such that flights 30 extends in a rotative sense opposite to that of grooves 40.

Grooves 40 terminate at the junction of sleeve 12 and section 17 as illustrated in FIG. 3. Surface 19 flares outwardly and away from sleeve 12 to define a chamber 44 communicating with the interior of sleeve 12.

Figure 2:
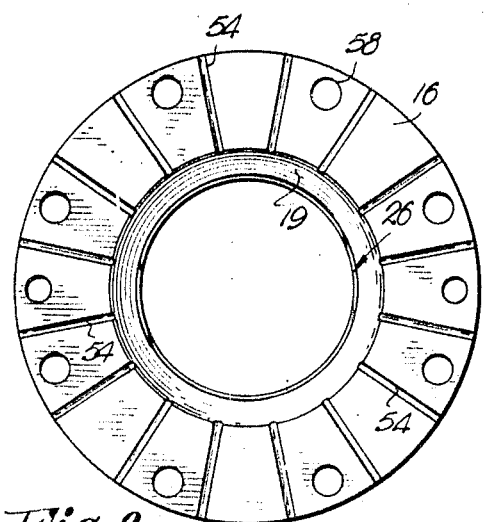
FIG. 2 is an end elevational view of the sleeve illustrating radial grooves in the end face thereof which form segments of radial material passages.

Face 16 is provided with a number of radial grooves 54 therein which are transversely semicircular and which extend from the outer annular edge 56 of surface 19 to the outer periphery of enlargement 14 as shown in FIG. 2. A number of internally threaded, bolt-receiving holes 58 are provided in enlargement 14 between adjacent pairs of grooves 54.

An extrusion head 60 closes the open end of enlargement 14 and has material passages which mate with grooves 54 and communicate with chamber 44 so that material forced into chamber 44 can be directed outwardly of machine 10. Head 60 includes a disc-like base 62 having an end face 64 provided with transversely semicircular, radially extending grooves 66 which mate with grooves 54 when head 60 is mounted in an operative position in the manner shown in FIG. 1. A conically-shaped boss 68 is integral with base 62 and extends into chamber 44. Holes 70 in base 62 mate with holes 58 so that bolts 2 may removably secure head 60 to flange 14. The lengths of grooves 54 and 66 are such that sufficient pressure will have been exerted on the material as it issues from head 60 to assure uniformity in the physical characteristics of the collets resulting from the extrusion process.

Figure 6:
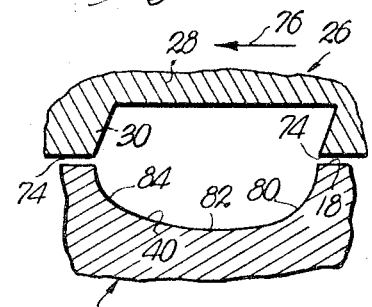
FIG. 6 is an enlarged, fragmentary view of the sleeve and screw illustrating the alignment of a pair of flights of the screw with a groove on the inner surface of the sleeve.

Flights 30 are in relatively close proximity to the inner surface 18 of sleeve 12 so as to define choke regions 74 having predetermined transverse dimensions. Since screw 26 normally rotates to advance material in the direction of arrow 76 of FIG. 6, the material between adjacent flights 30 will be moved radially outwardly of base 28 by centrifugal force and thence into grooves 40 within the radial path of movement of the material. Some of the material will be advanced forwardly in the direction of arrow 76, FIG. 6, by the continued rotation of screw 26. However, if the material is of a grain size too large to pass through regions 74, the material will be choked and thereby prevented from being advanced until the grain size has been reduced. This material that has been choked will move into an adjacent groove 40 and will be urged in different directions. The choked material adjacent the inner surface of a groove 40 will generally move axially of sleeve 12 away from head 60 and transversely of the corresponding grooves 40 along an arcuate path adjacent to the inner surface of the groove. In so doing, the material will be maintained under compression for a longer time so that further heat is absorbed by it as it moves in the aforesaid manner. This increased heat serves to enhance the plasticizing or gelatinizing of the material to in turn, cause the reduction of the grain or particle size of the material to permit the material to pass through regions 74.

It has been found that, to provide grooves 40 of predetermined transverse configurations, collets emanating from head 60 will be uniform in physical characteristics. With this construction, the wear of sleeve 12 is kept to a minimum, and proper buildup of heat in the material is assured so that the latter is sufficiently plasticized before it reaches chamber 44.

Optimum results will be attained if the transverse configuration of each groove 40 is defined by three different, coextensive arcs, each having a radius of curvature within a particular range. For a sleeve having a length of approximately 4.0 inches from the centerline of bore 20 to the end of the sleeve adjacent section 17, and an average inner diameter of approximately 3.06 inches, one arc segment 80 thereof has a radius in the range between .0937 inch and .300 inch. A second, central arc segment has a radius in the range between .4375 inch and .400 inch; and a third arc segment 84 has a radius in the range between .0625 inch and .280 inch. Sections 80, 82 and 84 should merge smoothly with each other so that there are no discontinuities along the arcuate width of each groove 40. At the outer ends of each of the arc segments 80 and 84, the remaining portions, if any, of the corresponding groove 40 are formed by flat segments joining the aforesaid outer ends of the arc segments 80 and 84 with inner surface 18 of sleeve 12. Thus, material entering grooves 40 will not move into pockets or the like from which it would be difficult or impossible to remove the material by the action of other material being advanced in the direction of arrow 76 by screw 26.

Since grooves 40 are in the opposite rotative sense from flights 30, material entering grooves 40 will tend to move in the opposite direction from the material being advanced by screw 26. This, in turn, will serve to maintain pressure on the material for a longer time so that the temperature will eventually reach a value sufficient to plasticize the same. By making sleeve 12 from a suitable material having high strength characteristics, such as cobalt steel or the like, the wear of sleeve 12, especially in the areas of grooves 40, will be minimized to thereby prolong the operational life thereof.

In use, material having a predetermined moisture content is directed into chute 24 and thereby, through bore 20 into sleeve 12. Inasmuch as screw 26 will be rotating at high speeds under the influence of shaft 32, the material will be immediately directed laterally toward head 60. As the material moves in this direction, it is thrown radially outwardly into grooves 40 and, as mentioned above, the material flows in different directions in grooves 40, as well as in the space between flights 30. If the grain size of the material is too large, the material will not pass through the choke regions 74 but will be returned to the proximal groove 40 for flow in particular directions. This movement of the material within grooves 40 serves to maintain the pressure on the material for a longer time and thereby increase the temperature thereof by virtue of the frictional interengagement of the materials with themselves and with the surfaces defining grooves 40. The transverse dimensions of regions 74 are generally equal, but such dimensions could be different, if desired.

As soon as the grain size and temperature of the material is sufficient to permit flow of the material through regions 74, the material will eventually pass into chamber 44 and thence radially outwardly into the material passages defined by grooves 54 and 66. Since boss 68 presents a smooth surface, the material will be uninterruptedly directed into the inlet ends of the material passages within which the material will be further compressed prior to emanation from head 60 and expansion into the form of individual, self-sustaining collets.

The collets can be collected in any suitable manner and can be further processed as desired in order to place the same in a marketable condition. All of the collets will be of substantially uniform physical characteristics so as to eliminate the problem encountered with collets formed with conventional apparatus and methods.

Figure 7:
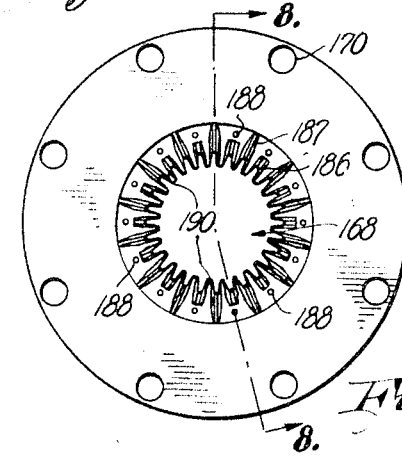
FIG. 7 is an end elevational view of another embodiment of the extrusion head.
Figure 8:
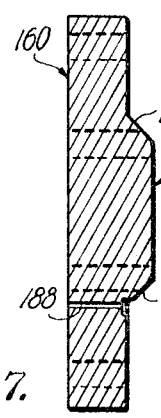
FIG. 8 is a cross-sectional view taken along line 8—8 of FIG. 7.

Another embodiment of an extrusion head is illustrated in FIGS. 7 and 8 and includes a head 160 having a central, circular boss 168 and provided with circumferentially spaced holes 170 for receiving bolts to interconnect the same to flange 14. In using head 160, face 16 of enlargement 14 will have no grooves therein, i.e., face 16 will be flat throughout.

Boss 168 is provided with a number of circumferentially spaced, short radial extensions 186 and a long radial extension 187 between and spaced from each pair of adjacent short extensions. A cylindrical long material passage 188 is provided between each pair of adjacent long extensions 187 in radial alignment with a corresponding short extension. Moreover, the junction between each short extension 186 and the adjacent long extension 187 defines an inclined line 190 extending from the outer face of boss 168 to the proximal face of head 160. Thus, a plurality of passages 188 is provided in head 160 to direct material therethrough when head 160 is coupled to flange 14. When head 160 is coupled in this manner, boss 168 is disposed within chamber 44 and lines 190 are substantially parallel to surface 19 of section 17. Material entering chamber 44 will then move along a path inclined to the axis of sleeve 12 to reach the entrance ends of passages 188.

In use, head 160, after being secured in place on flange 14, and after screw 26 is caused to rotate, will receive material from chamber 44, which material will flow along the inclined paths defined by lines 190 and surface 19 and then along the axial paths defined by passages 188. The material will emanate from head 160 in the form of elongated, self-sustaining collets of uniform size and density, it being clear that the material will have been subjected to the requisite pressures and temperatures within sleeve 12 in order to attain the uniformity in physical characteristics of the collets upon utilization of head 160.

The material suitable for use with the instant apparatus and in performing the steps of the present method is preferably a cereal grain having a moisture content. For example, cornmeal having a moisture content of approximately 12% can be used to form an expanded or puffed food product of the type described. Although cereal grains give the best results, other materials which are capable of being compressed and then expanded or puffed can be used with this invention.

Over extended periods of time, the abrasive action of the material forced through sleeve 12 will cause wear of the latter. However, if the radius of curvature of each of the aforesaid arc segments 80, 82 and 84 of each groove 40 is maintained in the specific range hereinabove set forth, the collets formed by machine 10 will remain substantially uniform in physical characteristics.

Having thus described the invention, what is claimed as new and desired to be secured by Letters Patent is:

1. A method of producing an expanded food product from cereal grain material having a moisture content comprising the steps of:

compressing a quantity of said material;

advancing the compressed quantity toward a region of reduced pressure to generate heat in the quantity due to friction and thereby elevate the temperature thereof to a value at which the particle size of the material is reduced sufficiently to render the quantity substantially plastic;

inhibiting the movement of the particles of said quantity toward said region until said particles have been reduced to a predetermined maximum dimension;

simultaneously moving at least a portion of said inhibited particles away from said region along an arcuate path having a first segment provided with a radius of curvature in the range between .0625 dimensional units and .280 dimensional units, a second segment having a radius of curvature in the range between .4375 dimensional units and .400 dimensional units, and a third segment having a radius of curvature in the range between .0937 dimensional units and .300 dimensional units, whereby to create additional heat of friction and thereby effect the reduction in particle size while preventing said inhibited particles from moving into stationary pockets; and moving the quantity into said region after the quantity has been rendered plastic to thereby cause the material of said quantity to expand and to form said food product.

References Cited

UNITED STATES PATENTS 2,295,868 9/1942 Schwekbe et al. _____ 99—81
2,705,927 4/1955 Graves et al. _____ 99—81
2,802,430 8/1957 Filler _____ 107—14
2,842,072 7/1958 Graves _____ 99—80 XR RAYMOND N. JONES, Primary Examiner U.S. Cl. X.R.
99—238